H. W. THOMAS.
HOSE COUPLING.
APPLICATION FILED APR. 21, 1910.
987,026.
Patented Mar. 14, 1911.
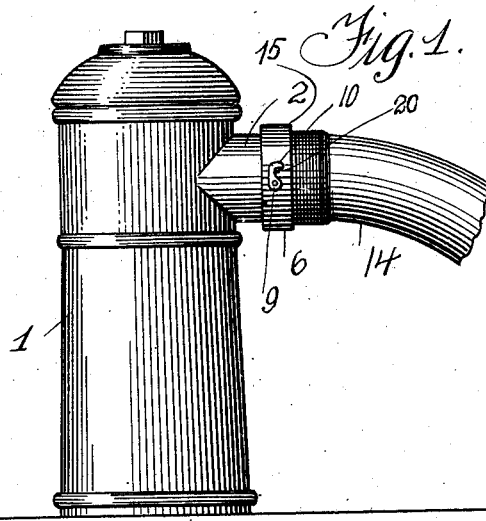
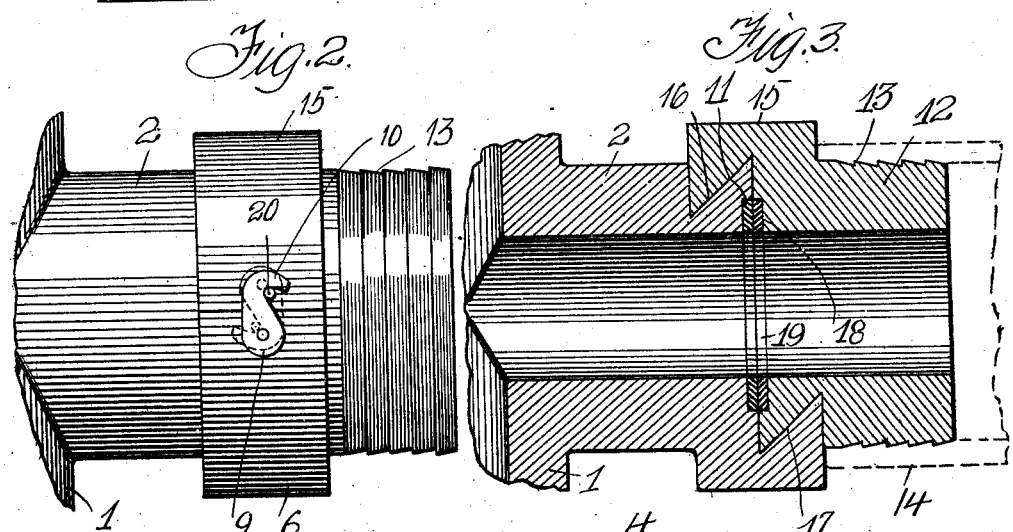
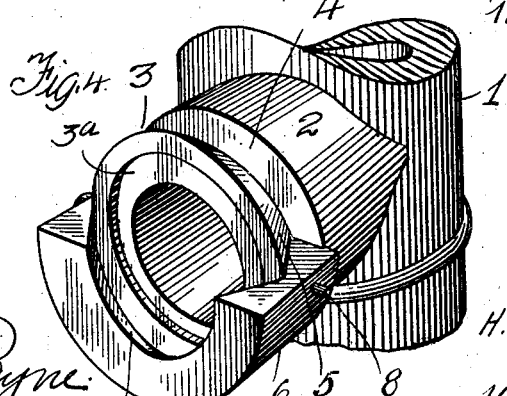
WITNESSES
INVENTOR
H. W. Thomas
by
Attorneys.

UNITED STATES PATENT OFFICE.

HOWARD W. THOMAS, OF CHARLEROI, PENNSYLVANIA.

HOSE-COUPLING.

987,026.  Specification of Letters Patent.  Patented Mar. 14, 1911.

Application filed April 21, 1910. Serial No. 556,728.

*To all whom it may concern:*

Be it known that I, HOWARD W. THOMAS, a citizen of the United States of America, residing at Charleroi, in the county of Washington and State of Pennsylvania, have invented certain new and useful Improvements in Hose-Couplers, of which the following is a specification, reference being had therein to the accompanying drawing.

This invention relates to hose couplers, and the primary object of my invention is to obviate the necessity of using screw threads for connecting the ends of hose, tubes, pipes, etc., and to provide simple and effective means whereby the confronting ends of hose can be easily and quickly connected to form a non-leakable and air-tight connection.

A further object of this invention is to provide a hose coupler that can be advantageously used by fire departments for making a quick connection, the coupler being simple in construction, durable, free from injury by rough use and highly efficient as a connection for fire hose, garden hose or various kinds of pipe.

These and such other objects as may hereinafter appear are attained by the novel construction, combination and arrangement of parts to be hereinafter specifically described and then claimed, and reference will now be had to the drawing forming a part of this specification, wherein there is illustrated a preferred embodiment of the invention, but it is to be understood that the structural elements thereof can be varied or changed without departing from the scope of the appended claim.

In the drawing: Figure 1 is a side elevation of the coupler as applied to a fire plug or hydrant, Fig. 2 is an enlarged side elevation of the coupler, Fig. 3 is a longitudinal sectional view of the same, and Fig. 4 is a perspective view of the stationary member of the coupler.

In the accompanying drawing the reference numeral 1 denotes a fire hydrant having an outlet pipe 2, and the end of this pipe has the upper half of the periphery thereof provided with a groove 3, the rear wall 4 of the groove being vertical while the remaining wall 5 of the groove inclines upwardly to the end of the pipe. The outer terminus of the inclined or beveled wall 5 projects beyond the outer terminus of the wall 4. The lower half of the periphery of the pipe 2 is inclosed by a semi-cylindrical collar 6 extending beyond the end of the pipe and having the inner wall thereof inclined from the outer end of the collar inwardly toward the end of the pipe 2, forming a pocket 7 which in cross section is the reverse of the groove 3. The collar 6 has the outer wall thereof provided with oppositely disposed pivot pins 8 for pivoted latches 9, these latches having hook-shaped ends 10 for a purpose that will presently appear.

The end of the pipe 3 is cut away to form an annular seat 3ᵃ for an annular gasket 11, preferably made of rubber.

The collar 6 is preferably made integral with the outlet pipe 2, and said collar and said pipe constitute the stationary member of the coupler, but I reserve the right to use this member as a movable member, for instance upon the end of a section of hose.

The movable member comprises a pipe or sleeve 12 having the periphery thereof at one end provided with circumferentially arranged teeth 13 adapted to engage in the inner walls of a section of hose 14. The section of hose can be bound or clamped to the pipe 12 by any suitable fastening means. The opposite end of the pipe or sleeve 12 is constructed similar to the pipe 2, that is, it is provided with a collar 15 having a pocket 16 to receive the upper half of the end of the pipe 2, while the lower half of the pipe or sleeve 12 is provided with a groove 17 to receive the end of the collar 6 of the pipe 2. The end of the pipe or sleeve 12 is cut away to form a seat 18 for a gasket 19 adapted to engage the gasket 11.

The two pipes 2 and 12 can be easily and quickly placed in engagement with each other and the latches 9 swung to engage outwardly extending pins 20 carried by the collar 15, thereby locking the two pipes in such a manner as to provide a non-leakable connection.

Having now described my invention what I claim as new, is:—

A hose coupling comprising the combination with an outlet pipe having a free end and the periphery at its free end formed with a groove extending substantially halfway of the circumference of said pipe, said groove having one of its walls extending vertically and the other of its walls beveled outwardly and having the outer terminus thereof projecting beyond the outer terminus of the vertical wall, a semi-cylindrical collar formed integral with and projecting from the free end of said pipe, the projecting portion of said collar having its inner face beveled reversely with respect to the beveled wall of said groove, said pipe further having its free end cut-away to provide an annular seat, of a sleeve having a free end and the periphery at its free end formed with a groove extending substantially half-way of the circumference of said sleeve, said groove having one of its walls extending vertically and the other of its walls beveled outwardly and having its outer terminus projecting beyond the outer terminus of the beveled wall of the sleeve, a semi-cylindrical collar formed integral with and projecting from the free end of said sleeve, the projecting portion of said collar having its inner face beveled reversely with respect to the beveled wall of said groove of said sleeve, said sleeve further having its free end cut-away to provide an annular seat, said collars being alternately disposed with respect to each other and one adapted to engage in the groove of the sleeve and the other adapted to engage in the groove of the pipe whereby the pipe and sleeve will be connected together, gaskets mounted in said seats, and means for detachably connecting the collars together.

In testimony whereof I affix my signature in the presence of two witnesses.

HOWARD W. THOMAS.

Witnesses:
WM. H. GASWAY,
JAS. E. MANSFIELD.

---

Copies of this patent may be obtained for five cents each, by addressing the "Commissioner of Patents, Washington, D. C."